(12) United States Patent
Hunt et al.

(10) Patent No.: US 12,306,462 B2
(45) Date of Patent: May 20, 2025

(54) METHODS FOR ACQUIRING IMAGES OF CELLS WITHIN A SPECIMEN ON A SLIDE

(71) Applicant: Hologic, Inc., Marlborough, MA (US)

(72) Inventors: Barry F. Hunt, Nashua, NH (US); Jeffrey D. Struven, Nashua, NH (US); Sidney H. Mayer, Carlisle, MA (US)

(73) Assignee: Hologic, Inc., Marlborough, MA (US)

( * ) Notice: Subject to any disclaimer, the term of this patent is extended or adjusted under 35 U.S.C. 154(b) by 0 days.

(21) Appl. No.: 18/991,269

(22) Filed: Dec. 20, 2024

(65) Prior Publication Data

US 2025/0138279 A1    May 1, 2025

Related U.S. Application Data

(63) Continuation of application No. 17/749,985, filed on May 20, 2022, now Pat. No. 12,204,172, which is a
(Continued)

(51) Int. Cl.
*G02B 7/36* (2021.01)
*G02B 21/24* (2006.01)
(Continued)

(52) U.S. Cl.
CPC ............. *G02B 7/36* (2013.01); *G02B 21/244* (2013.01); *G02B 21/367* (2013.01); *H04N 23/959* (2023.01); *G02B 21/34* (2013.01)

(58) Field of Classification Search
CPC ...... G02B 7/36; G02B 21/244; G02B 21/367; G02B 21/34; H04N 23/959
See application file for complete search history.

(56) References Cited

U.S. PATENT DOCUMENTS

| 2014/0193088 A1 | 7/2014 | Capata et al. |
| 2014/0300724 A1 | 10/2014 | Olson et al. |

(Continued)

FOREIGN PATENT DOCUMENTS

| JP | 2008-500586 | 1/2008 |
| JP | 2014-134632 | 7/2014 |

(Continued)

OTHER PUBLICATIONS

Non-Final Office Action for U.S. Appl. No. 17/749,985 dated Mar. 13, 2024.
(Continued)

*Primary Examiner* — James T Boylan
(74) *Attorney, Agent, or Firm* — Vista IP Law Group, LLP

(57) ABSTRACT

A system and method for acquiring images of objects distributed within a specimen affixed to a surface of a slide, the specimen having an uneven height relative to the slide surface using a camera having an objective lens with an optical axis that forms a non-orthogonal angle with the surface of the slide, the method including acquiring a first plurality of images of a first linear portion of the specimen; evaluating a focus of objects within the linear portion of the specimen captured in the first plurality of images; and acquiring a second plurality of images of the first linear portion or of a second linear portion of the specimen different from the first, wherein a height of the objective lens relative to the slide surface is varied during acquisition of the second plurality of images based on the evaluated focus of the objects captured in the first plurality of images.

24 Claims, 12 Drawing Sheets

Related U.S. Application Data continuation of application No. PCT/US2020/061832, filed on Nov. 23, 2020.

(60) Provisional application No. 62/940,163, filed on Nov. 25, 2019.

(51) Int. Cl.
  G02B 21/36 (2006.01)
  H04N 23/959 (2023.01)
  G02B 21/34 (2006.01)

(56) References Cited

U.S. PATENT DOCUMENTS

| | | | |
|---|---|---|---|
| 2015/0309299 A1* | 10/2015 | Watanabe | G02B 21/241 348/79 |
| 2017/0323431 A1* | 11/2017 | Sarkar | G06T 7/0014 |
| 2018/0295254 A1 | 10/2018 | Gouch et al. | |
| 2019/0101739 A1 | 4/2019 | Chen et al. | |
| 2020/0372635 A1 | 11/2020 | Veidman et al. | |
| 2021/0350112 A1* | 11/2021 | Jenoski | G02B 21/34 |

FOREIGN PATENT DOCUMENTS

| | | |
|---|---|---|
| JP | 2015-102694 | 6/2015 |
| JP | 2019-507384 | 3/2019 |
| TW | 201830086 | 8/2018 |
| WO | WO 2005/119325 A2 | 12/2005 |
| WO | WO 2017/144482 A1 | 8/2017 |

OTHER PUBLICATIONS

Notice of Allowance for U.S. Appl. No. 17/749,985 dated Sep. 25, 2024.

Foreign OA for JP Patent Appln. No. 2022-530666 dated Sep. 3, 2024 (with English translation).

Foreign OA for CN Patent Appln. No. 202080077802.6 dated Sep. 20, 2023 (with English translation).

Foreign OA for CA Patent Appln. No. 3157382 dated Jul. 25, 2023.

Foreign OA for TW Patent Appln. No. 109140962 dated Jan. 30, 2023.

Partial English Translation of Foreign OA for TW Patent Appln. No. 109140962 dated Jan. 30, 2023.

Foreign Search Report for TW Patent Appln. No. 109140962 dated Jan. 30, 2023 (in English).

PCT International Search Report and Written Opinion for International Appln. No. PCT/US2020/061832 dated Mar. 5, 2021.

Foreign OA for KR Patent Appln. No. 10-2022-7015312 dated Mar. 24, 2025 (with English translation).

* cited by examiner

| Slide Number (Glass Cover Slip) | ΔZ Focus Depth (in μ) |
| --- | --- |
| 1 | 8.4 |
| 2 | 11.3 |
| 3 | 11 |
| 4 | 13.7 |
| 5 | 9 |
| 6 | 8.8 |
| 7 | 13.2 |
| 8 | 11.85 |
| 9 | 12.6 |
| MEAN ± STD | 11.09 ± 1.969 |

| Slide Number (Plastic Cover Slip) | ΔZ Focus Depth (in μ) |
| --- | --- |
| 1 | 11.8 |
| 2 | 22 |
| 3 | 14.38 |
| 4 | 24.2 |
| 5 | 15 |
| 6 | 22.86 |
| 7 | 47 |
| 8 | 28 |
| 9 | 15.7 |
| 10 | 27 |
| 11 | 24.48 |
| 12 | 23.68 |
| 13 | 19.9 |
| 14 | 29.6 |
| MEAN ± STD | 23.6 ± 8.96 |

FIG. 3

METHODS FOR ACQUIRING IMAGES OF CELLS WITHIN A SPECIMEN ON A SLIDE

RELATED APPLICATION DATA

The present application is a continuation of U.S. patent application Ser. No. 17/749,985, filed May 20, 2022, entitled "DIGITAL IMAGING SYSTEM AND METHOD," which is a continuation of International Application No. PCT/US2020/061832, filed Nov. 23, 2020, which claims the benefit under 35 U.S.C. § 119 to U.S. Provisional Patent Application Ser. No. 62/940,163, filed Nov. 25, 2019, the contents of all of which are hereby incorporated herein by reference in their entirety into the present application.

FIELD OF THE DISCLOSURE

This disclosure is generally directed to systems and methods for acquiring digital images of specimens affixed to the surface of a slide, such as cytological (cellular) specimens that have a thickness exceeding the depth of field of the imager.

INCORPORATION BY REFERENCE

All U.S. and PCT Patents and Publications identified herein for any purpose are incorporated by reference in their entireties.

BACKGROUND

Cytology is a branch of biology dealing with the study of the formation, structure, and function of cells. As applied in a laboratory setting, cytologists, cytotechnologists, and other medical professionals make medical diagnoses of a patient's condition based on visual examination of a sample of the patient's cells, such sample being referred to herein as a "cytological" specimen. A typical cytological technique is a "pap smear" test, in which cells are scraped from a woman's cervix and analyzed in order to detect the presence of abnormal cells, a precursor to the onset of cervical cancer. Cytological techniques are also used to detect abnormal cells and disease in other parts of the human body.

Cytological techniques are widely employed because collection of cell samples for analysis is generally less invasive than traditional surgical pathological procedures such as biopsies, whereby a solid tissue sample, referred to herein as a "pathologic" specimen, is excised from the patient using specialized biopsy needles having spring loaded translatable stylets, fixed cannulae, and the like. Cell samples may be obtained from the patient by a variety of techniques including, for example, by scraping or swabbing an area, or by using a needle to aspirate body liquids from the chest cavity, bladder, spinal canal, or other appropriate area. The acquired cell sample is typically placed in a preservative solution and subsequently extracted from the solution and transferred to a glass slide. A fixative is applied to the cell sample to ensure the cells remain in place on the glass slide for facilitating subsequent staining and examination.

It is generally desirable that the cells on the slide have a proper spatial distribution, so that individual cells can be examined. A single layer of cells is typically preferred. Accordingly, preparing a cytological specimen from a liquid sample containing many cells (e.g., tens of thousands) typically requires that the cells first be separated from each other by mechanical dispersion, liquidic shear, or other techniques so that a thin, monolayer of cells can be collected and deposited on the slide. In this manner, the cytotechnologist can more readily discern the presence of any abnormal cells in the patient sample. The cells are also able to be counted to ensure that an adequate number of cells have been evaluated.

Certain methods and apparatus for generating a thin monolayer of cells from a liquid sample container and then transferring this thin layer to a "specimen slide" that is advantageous for visual examination are disclosed in U.S. Pat. Nos. 5,143,627, 5,240,606, 5,269,918, 5,282,978, 6,562,299, 6,572,824 and 7,579,190. According to one method disclosed in these patents, a patient's cells suspended in a preservative liquid and stored in a sample container are dispersed using a spinning sample collector inserted into the container. A controlled vacuum is applied to the sample collector to draw the liquid through a screen filter thereof until a desired quantity and spatial distribution of cells is collected against the filter. Thereafter, the sample collector is removed from the sample container and the filter portion impressed against a glass slide to transfer the collected cells to the slide in substantially the same spatial distribution as collected. Apparatus manufactured according to the teachings of one or more of these patents have been commercially successful, such as the ThinPrep® 2000 Processor (specimen slides processed from patient samples one at a time), and the ThinPrep® 5000 Processor (specimen slides batch processed from patient samples), which are manufactured and sold by Hologic, Inc., located in Marlborough, Massachusetts. Further reference is made to U.S. Pat. Nos. 7,556,777, and 7,771,662.

Once a specimen slide has been prepared, the specimen may be visually inspected by a cytotechnologist, typically under magnification, and with or without various sources of illumination. Additionally, or alternatively, automated slide imaging systems are used to aid in the cytological inspection process. For example, an automated slide imaging system may capture an image of all, or substantially all, of the individual cells within a cytological specimen fixed to the slide, and perform a preliminary assessment of the cells using image processing techniques in order to direct the cytotechnologist to potentially the most relevant cells on the slide for close inspection. Examples of such imaging systems are disclosed in U.S. Pat. Nos. 7,587,078, 6,665,060, 7,006,674, 7,369,304 and 7,590,492. Whether by inspection of the actual specimen slide under magnification, or of magnified images of the specimen, the specimen is typically classified by the cytotechnologist as either "normal" or "abnormal" where an abnormal sample typically falls in one of the major categories defined by The Bethesda System for Reporting Cervical/Vaginal Cytologic Diagnosis.

However, there are a number of shortcomings associated with prior systems and methods for acquiring digital images of biological specimens. For one, prior systems and methods suffer from slow acquisition times because of the time required to stop and focus while scanning the entire specimen. In addition, those prior systems and methods which do not stop to focus typically provide only a single plane of focus across the specimen. Biological specimens, including both cytological and pathologic specimens, are actually three-dimensional (i.e., having a depth). Therefore, due to the high magnification and the focal apertures required to obtain digital images of biological specimens, the depth of field of the images is very limited. Accordingly, portions of a specimen outside of the depth of field in the focal plane will be out of focus or not visible in the image. In order to obtain in-focus digital images at multiple, different depths of the specimen, the plane of focus must be adjusted, such as by moving the specimen or camera, or by adjusting a focusing lens. However, this requires an additional scan of the specimen for each plane of focus, or it requires periodically stopping to re-focus, which further slows the acquisition time.

Many of the foregoing problems of the prior art imaging systems are addressed and resolved by the imaging systems and methods disclosed and described in PCT application publication WO 2020/091965A2 (PCT/US19/55458, filed Oct. 9, 2019). Key aspects of the imaging systems and methods disclosed in WO 2020/091965A2 are described and discussed below, and include the ability to capture images of cells at varying depths within the specimen in focus with a single scanning pass of a camera having a lens objective that is tilted with respect to the slide surface to capture images within a focal range including the entire thickness of the specimen. However, a particular problem that arises with some specimen slides and which is not addressed in WO 2020/091965A2, is when the thickness of the specimen, i.e., the height of the specimen relative to the slide surface, is non-uniform due, for example, to a non-uniform coverslip or other aspects of the original slide preparation. When this occurs, some of the cells—possibly a substantial amount—in the specimen will be outside of the focal range. Thus, further improvements to the imaging systems and techniques disclosed in WO 2020/091965A2 would be useful to solve this problem of out-of-focus cells.

SUMMARY

In accordance with a first aspect of the disclosed inventions, a method is disclosed for acquiring images of objects distributed within a specimen affixed to a surface of a slide using a camera having an objective lens with an optical axis that forms a non-orthogonal angle with the surface of the slide, the specimen having an uneven height relative to the slide surface, wherein the method includes (i) acquiring a first plurality of images of a first linear portion of the specimen; (ii) evaluating a focus of objects within the linear portion of the specimen captured in the first plurality of images; and (iii) acquiring a second plurality of images of the first linear portion or of a second linear portion of the specimen different from the first, wherein a height of the objective lens relative to the slide surface is varied during acquisition of the second plurality of images based on the evaluated focus of the objects captured in the first plurality of images. Optionally, a height of the objective lens relative to the slide surface may be substantially constant during acquisition of the first plurality of images. Optionally, the second linear portion is directly adjacent to the first linear portion.

In various embodiments, evaluating the focus of the objects captured in the first plurality of images includes determining whether a total number of out-of-focus objects exceeds a threshold number, and then either (i) acquiring the second plurality of images of the first linear portion if the total number of out-of-focus objects in the first plurality of images exceeds the threshold number, or (ii) acquiring the second plurality of images of the second linear portion if the total number of out-of-focus objects in the first plurality of images does not exceed the threshold number.

In various embodiments, evaluating the focus of the objects captured in the first plurality of images includes determining respective heights of the out-of-focus objects relative to the slide surface, and whether the respective out-of-focus objects are located at a height relative to the slide surface that is outside of an in-focus range of the objective lens during acquisition in the first plurality of images. Preferably, evaluating the focus of the objects in the first plurality of images includes determining whether the respective out-of-focus objects are located at a height relative to the slide surface that is higher than a maximum height or lower than a minimum height, respectively, of an in-focus range of the objective lens during acquisition in the first plurality of images.

In various embodiments, evaluating the focus of the objects in the first plurality of images includes determining respective locations of out-of-focus objects within the first linear portion.

In various embodiments, one or both of the camera and slide is moved relative to the other one during acquisition of the images, wherein the height of the objective lens relative to the slide surface is varied by increasing and/or decreasing a height of the camera relative to the slide surface as a function of a linear position of the camera with respect to a lengthwise location of the respective first or second linear portion. Notably, the height of the objective lens relative to the slide surface may be varied by moving the slide vertically relative to the camera, or moving the camera vertically relative to the slide, or both, during acquisition of the images.

In various embodiments, when the second plurality of images is acquired of the first linear portion, the method further includes evaluating a focus of the objects captured in the second plurality of images; and acquiring a third plurality of images of the second linear portion, wherein the height of the objective lens relative to the slide surface is varied during acquisition of the third plurality of images based on the evaluated focus of the objects captured in the second plurality of images.

In accordance with another aspect of the inventions disclosed herein, a method for acquiring images of objects distributed within a specimen affixed to a surface of a slide using a camera having an objective lens with an optical axis that forms a non-orthogonal angle with the surface of the slide, the specimen having an uneven height relative to the slide surface, the method including (a) acquiring a first plurality of images of a linear portion of the specimen; (b) evaluating a focus of the objects captured in the first plurality of images; (c) acquiring a second plurality of images of the same or a different linear portion of the specimen, wherein a height of the objective lens relative to the slide surface is varied during acquisition of the second plurality of images based on the evaluated focus of the objects captured in the first plurality of images; and (d) repeating (a)-(c) until images of substantially the entire specimen have been acquired. When the second plurality of images are obtained from the different linear portion of the specimen, such different linear portion may be directly adjacent to the linear portion of which the first plurality of images was acquired.

In various embodiments, evaluating the focus of the objects captured in the first plurality of images may include determining whether a total number of out-of-focus objects exceeds a threshold number.

In a preferred embodiment, evaluating the focus of the objects in the first plurality of images includes determining whether the respective out-of-focus objects are located at a height relative to the slide surface that is higher than a maximum height or lower than a minimum height, respectively, of an in-focus range of the objective lens during acquisition in the first plurality of images, as well as determining respective locations of the out-of-focus objects within the respective linear portion.

In a preferred embodiment, one or both of the camera and slide is moved laterally relative to the other one during acquisition of the respective first and second pluralities of images, wherein the height of the objective lens relative to the slide surface is varied by increasing and/or decreasing a height of the camera relative to the slide surface as a function of a linear position of the camera with respect to a lengthwise location of the respective linear portion. Again, the height of the objective lens relative to the slide surface may be varied by moving the slide vertically relative to the camera, or moving the camera vertically relative to the slide, or both, during acquisition of the images.

In accordance with a further aspect of the disclosed inventions, a system is provided for acquiring images of objects distributed within a specimen affixed to a surface of a slide, the specimen having an uneven height relative to the slide surface, the system including a camera having an objective lens with an optical axis, wherein the camera is positioned such that the optical axis forms a non-orthogonal angle with the surface of the slide. The system further includes an image processor operatively coupled with the camera, wherein the image processor is configured to receive a first plurality of images of a first linear portion of the specimen acquired by the camera; evaluate a focus of objects within the linear portion of the specimen captured in the first plurality of images; and cause the camera to acquire a second plurality of images of the first linear portion or of a second linear portion of the specimen different from the first, wherein a height of the objective lens relative to the slide surface is varied during acquisition of the second plurality of images based on the evaluated focus of the objects captured in the first plurality of images.

In one embodiment, a height of the objective lens relative to the slide surface is substantially constant during acquisition of the first plurality of images.

In one embodiment, the image processor evaluates the focus of the objects captured in the first plurality of images at least in part by determining whether a total number of out-of-focus objects exceeds a threshold number.

In one embodiment, the image processor evaluates the focus of the objects captured in the first plurality of images at least in part by determining respective heights of the out-of-focus objects relative to the slide surface.

In one embodiment, the image processor evaluates the focus of the objects in the first plurality of images at least in part by determining whether the respective out-of-focus objects are located at a height relative to the slide surface that is outside of an in-focus range of the objective lens during acquisition in the first plurality of images.

In one embodiment, the image processor evaluates the focus of the objects in the first plurality of images at least in part by determining whether the respective out-of-focus objects are located at a height relative to the slide surface that is higher than a maximum height or lower than a minimum height, respectively, of an in-focus range of the objective lens during acquisition in the first plurality of images.

In one embodiment, the image processor evaluates the focus of the objects in the first plurality of images at least in part by determining respective locations of out-of-focus objects within the first linear portion.

In various embodiments, one or both of the camera and slide are preferably configured to move laterally relative to the other one during acquisition of the images.

Without limitation, in one embodiment, the height of the objective lens relative to the slide surface is varied by increasing and/or decreasing a height of the slide surface relative to the camera as a function of a linear position of the camera with respect to a lengthwise location of the respective linear portion. In a same or another embodiment, the height of the objective lens relative to the slide surface is varied by increasing and/or decreasing a height of the camera relative to the slide surface as a function of a linear position of the camera with respect to a lengthwise location of the respective first or second linear portion.

The second plurality of images may be acquired of the first or second linear portions. In one embodiment, the second plurality of images is acquired of the first linear portion, the image processor being further configured to evaluate a focus of the objects captured in the second plurality of images; and cause the camera to acquire a third plurality of images of the second linear portion, wherein the height of the objective lens relative to the slide surface is varied during acquisition of the third plurality of images based on the evaluated focus of the objects captured in the second plurality of images. Without limitation, the second linear portion may be directly adjacent to the first linear portion.

Other and further aspects and features of the disclosed embodiments will become apparent from the ensuing detailed description in view of the accompanying drawings.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant, and in which:

FIG. 3 is a table of the results of a study of relative heights of cell content;

DETAILED DESCRIPTION

The emergence of digital whole slide imaging (WSI) systems is set to revolutionize the fields of pathology and cytology. The ability to obtain high quality whole slide images quickly will be a vital step in a successful clinical workflow, especially for high volume screening applications like the Pap test. Liquid-based cytology slides present a near monolayer visually to the reviewer, but cytology is inherently 3-dimensional. These slides can be challenging for WSI due to the focal depth of closely juxtaposed material that can be an order of magnitude higher than the Depth of Field (DOF) of a high-power microscope objective. For this reason, cytology slides are more challenging to image than histologic tissue slides. Slides with film coverslips can also add to the scanning depth requirement due to curvature across the slide cell spot region. As such, the distance between objects of interest in a cytological specimen and the glass slide that the specimen is affixed to may vary greatly, relative to the DOF of the microscope objective. Most current WSI systems require repeated scans to cover multiple focal planes in order to acquire quality images, greatly increasing imaging time. As such, efficiently obtaining high focus quality images for cytology slides is challenging. Disclosed herein are systems and methods for efficiently scanning such slides to obtain high quality, in-focus images.

Figure 1:
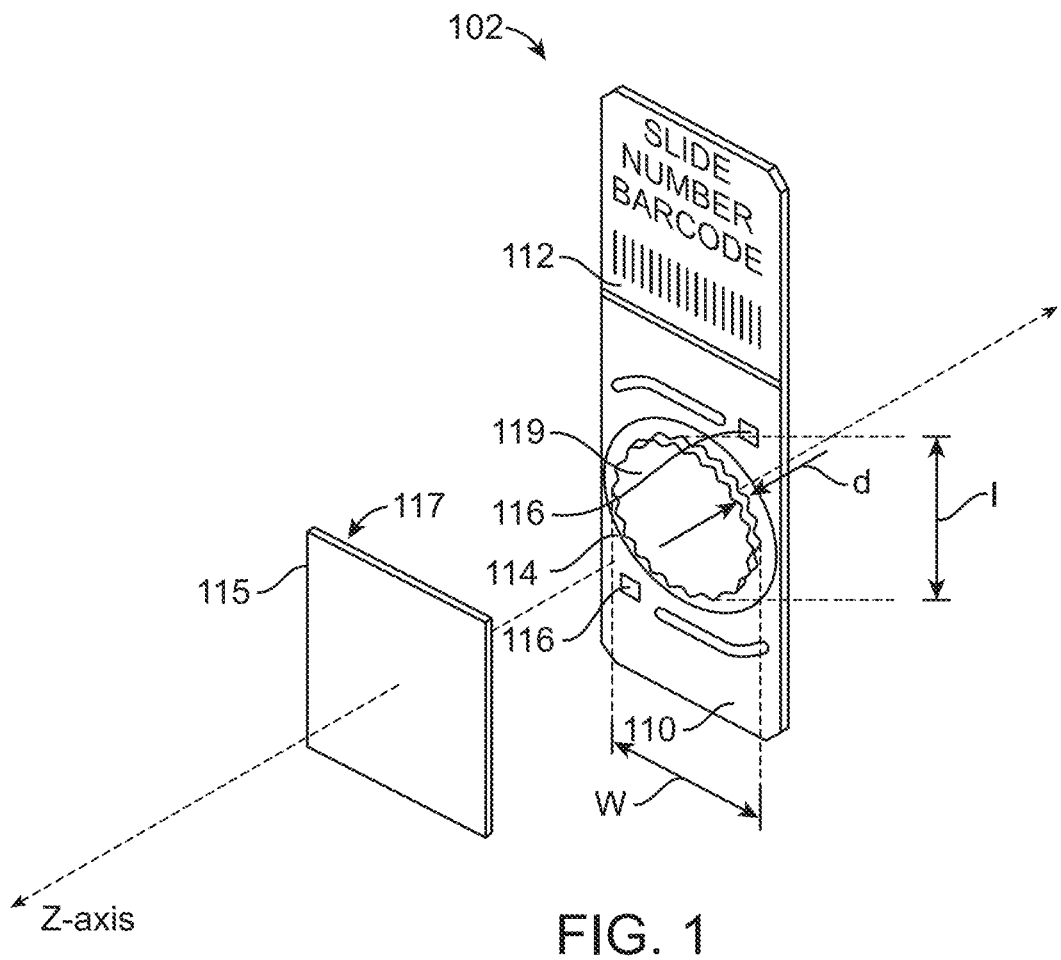
FIG. 1 shows a specimen slide for use in an automated digital imaging system.

Referring to FIG. 1, an exemplary embodiment of a microscope slide 102 is shown. The microscope slide 102 is a rectangular glass plate 110 (or other suitable material) having a slide identification area 112, a specimen area 114, and fiducial marks 116. The microscope slide 102 may be a standard size microscope slide which is about 75 mm by 25 mm, or other suitable size. The microscope slide 102 may have beveled corners to facilitate handling and positioning of the slide 102. The specimen area 114 may be a circle having a diameter up to approximately 22 mm. The entire specimen area 114 on the microscope slide 102 may be imaged. The slide identification area 112 may be up to approximately 25-28 mm in length. The slide identification portion 112 may be printed with a barcode, ID number, and/or other information. The specimen area 114 is left as a clear area of the glass slide 102. The fiducial marks 116 may be used by an imager as reference points on the slide 102 to determine the location and/or orientation of the slide 102 and its features relative to the imager. A specimen 119 including a plurality of objects distributed within a three-dimensional volume is affixed to the slide 102, usually within the specimen area 114, but in some cases the specimen can extend outside the specimen area 114. The three-dimensional volume of the specimen 119 has a length (l), a width (w) and a thickness or depth (d). The thickness (d) defines a z-axis relative to the surface of the slide 102. The specimen 119 may be any suitable specimen, such as a cytological specimen in which the objects are cells, a solid tissue sample in which the objects are tissue structures, etc.

As depicted in FIG. 1, a coverslip 115 may be used to cover the specimen 119 in the specimen area 114. The specimen coverslip 115 is sufficiently transparent to acquire images of the specimen 119 through the coverslip 115. In other words, the coverslip 115 does not impede an imager from acquiring images through coverslip 115. The coverslip 115 functions to preserve the specimen 119 and protect it from contamination and from contaminating other objects, and also holds the specimen 119 flat and in place. The coverslip 115 has a thickness 117.

Figure 2:
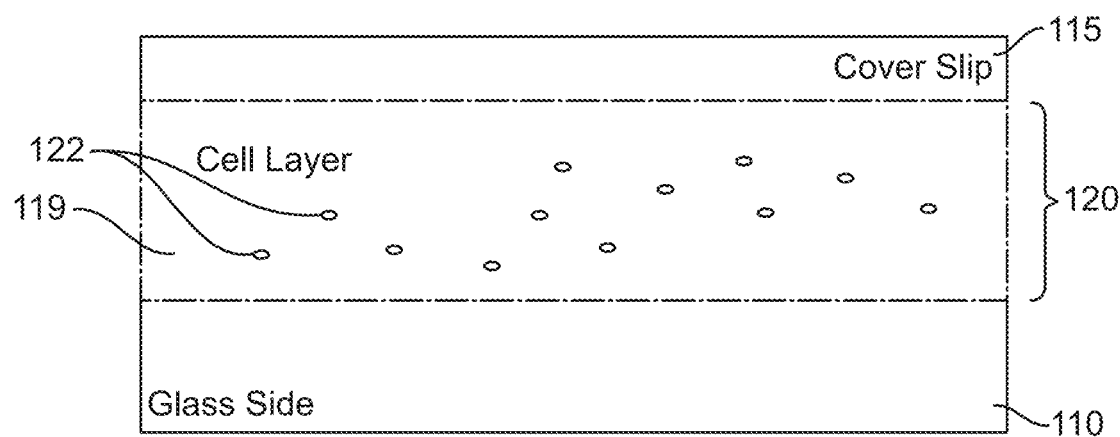
FIG. 2 is a cross-section of a specimen area of the slide of FIG. 1.

As shown in FIG. 2, the specimen 119 disposed between the glass slide 110 and the cover slip 115 has a thickness 120. Cells 122 are dispersed throughout the specimen layer at various depths, or z-axis positions. A specimen may have a thickness that, over the entire specimen, exceeds the depth-of-field of the optics used for acquiring images of the objects (such as cells 122) in the specimen. This can especially happen in liquid based cytological specimens where individual cells are collected. The cover slip 115 placed over the top of the specimen 119 can be made of glass or plastic, and is adhered to the slide 110 with a thin layer of adhesive. It has been observed that cells tend to float in the adhesive, which causes them to rise above the glass 110. Further, the cover slip 115 is not always perfectly flat and often exhibits undulations, mounds and valleys. This causes an inconsistent thickness of the adhesive which in turn causes the cells' distance from the glass substrate 110, and hence from the objective lens, to vary, sometimes more than the depth-of-field can accommodate. Disclosed herein is a digital imaging method and system for efficiently scanning cytology slides that solves the problem of digitizing a specimen which, in a given field of view, is thicker than the depth-of-field of the objective lens.

Because cells may be suspended in the mounting medium and may also stack up, cytology slides are inherently 3-dimensional. Since a microscope objective has such a small depth of field (DOF), cells cannot all be captured in focus in a single image. In fact, individual cells may be thicker than a single DOF. A 40× microscope objective lens with NA 0.75 has a depth of field of less than 2 microns. Cytology slides with flexible film (plastic) coverslips can require even more scanning (i.e., image acquiring) depth due to curvature across the cell spot region. To capture quality images of all cells on a cytology slide (such as a ThinPrep slide), much wider ranges of focus are required.

In one example, 23 ThinPrep Pap slides were scanned on a computer-controlled microscope with a digital camera (Hologic ThinPrep Integrated Imager) to gather cell preparation depth data. First, the cell spot area was scanned using a computer-driven XY stage. At each location, a stack of images at a wide range (>40 microns) of Z height was captured. Every image was divided into small regions (35 microns square) and the Brenner focus score metric was evaluated for every level in the Z stack. The optimal focus for that tile was determined. By focusing on the fiducial marks printed on the slide, the overall slide glass plane was determined and subtracted from the focus data to determine relative heights of cell content.

Figure 4A:
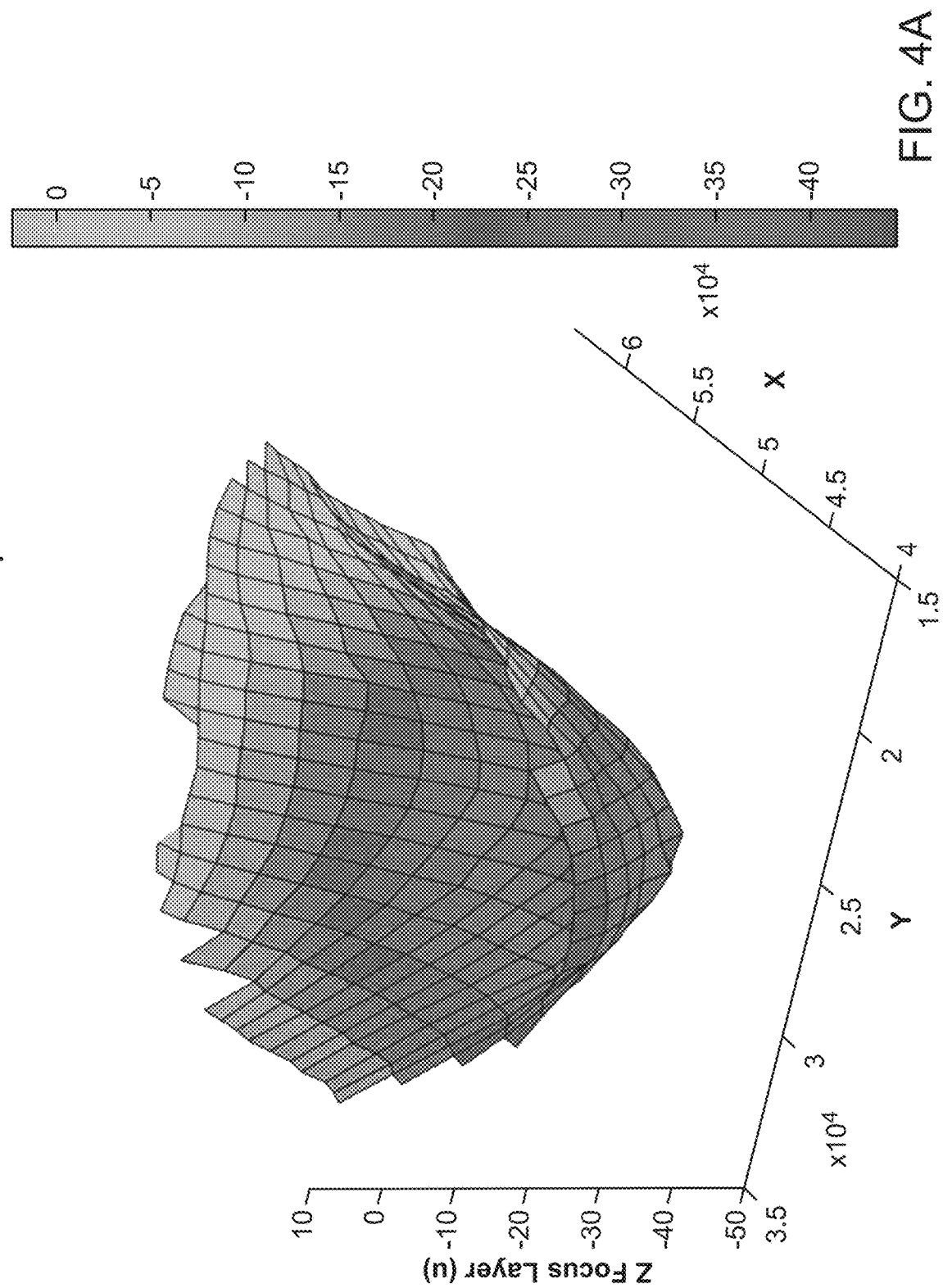
FIGS. 4A and 4B are a 3D focus map and a heat map, respectively, depicting relative heights of cell content across a specimen.
Figure 4B:
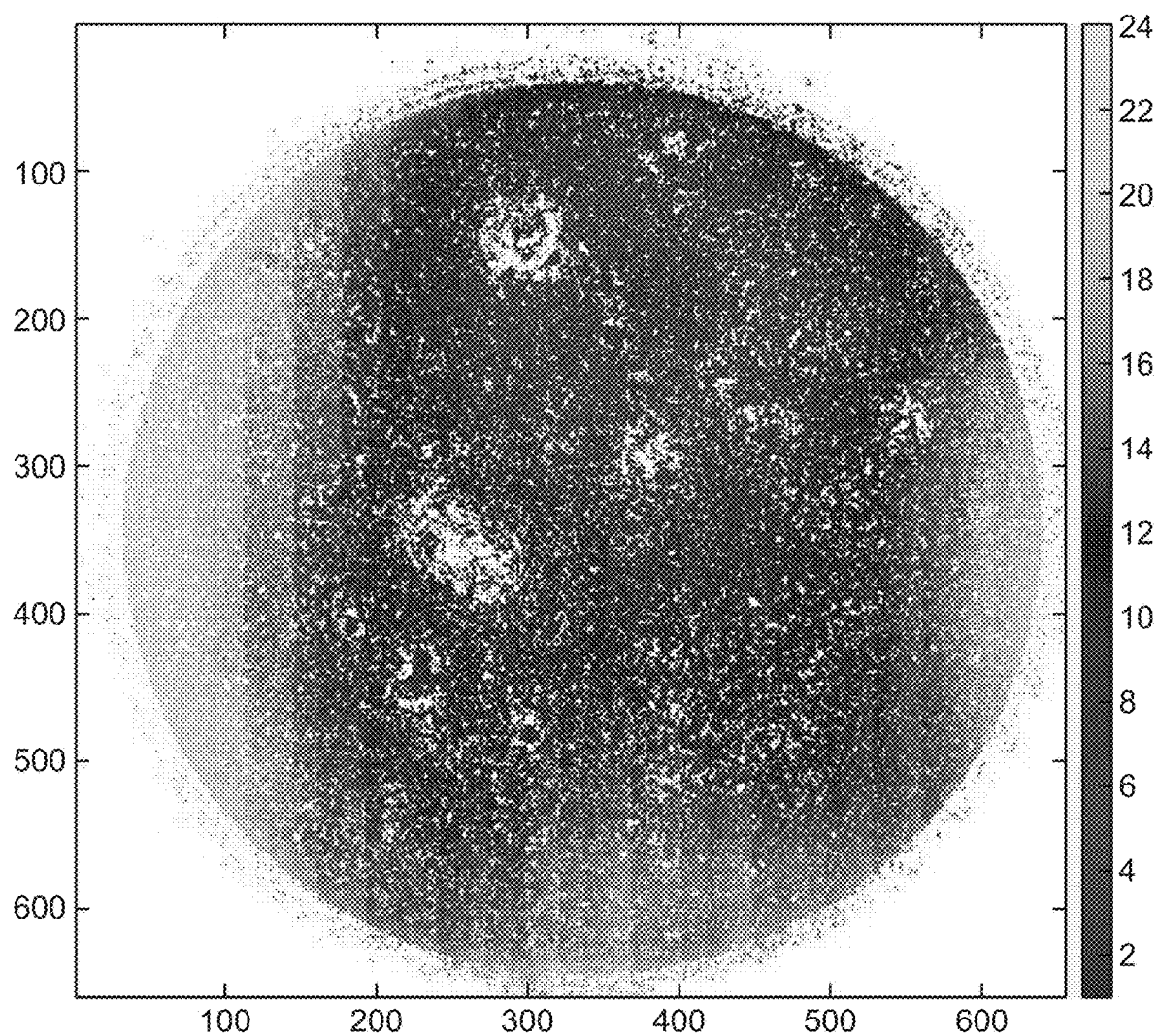

The table in FIG. 3 presents a summary of the data obtained from these 23 slides. The table shows that the average cell depth of the ThinPrep slides was 11.09 microns for slides with a glass cover slip and 23.6 microns for slides with film cover slips. In some cases, cell depth can be greater than 40 microns. Note that even with glass coverslips, the local variations in cell height within a slide amount to as much as 7 times the depth of field of the microscope objective. A surface plot focus map for each slide was created and reviewed. An example is shown in FIGS. 4A and 4B for a film-coverslip slide, which shows the effect of curvature over the extent of the cell spot region. In particular, for the example shown in FIGS. 4A and 4B, the cells in the middle portion of the specimen are closer to the glass slide, while the cells around the edges of the specimen are closer to the coverslip.

Figure 5:
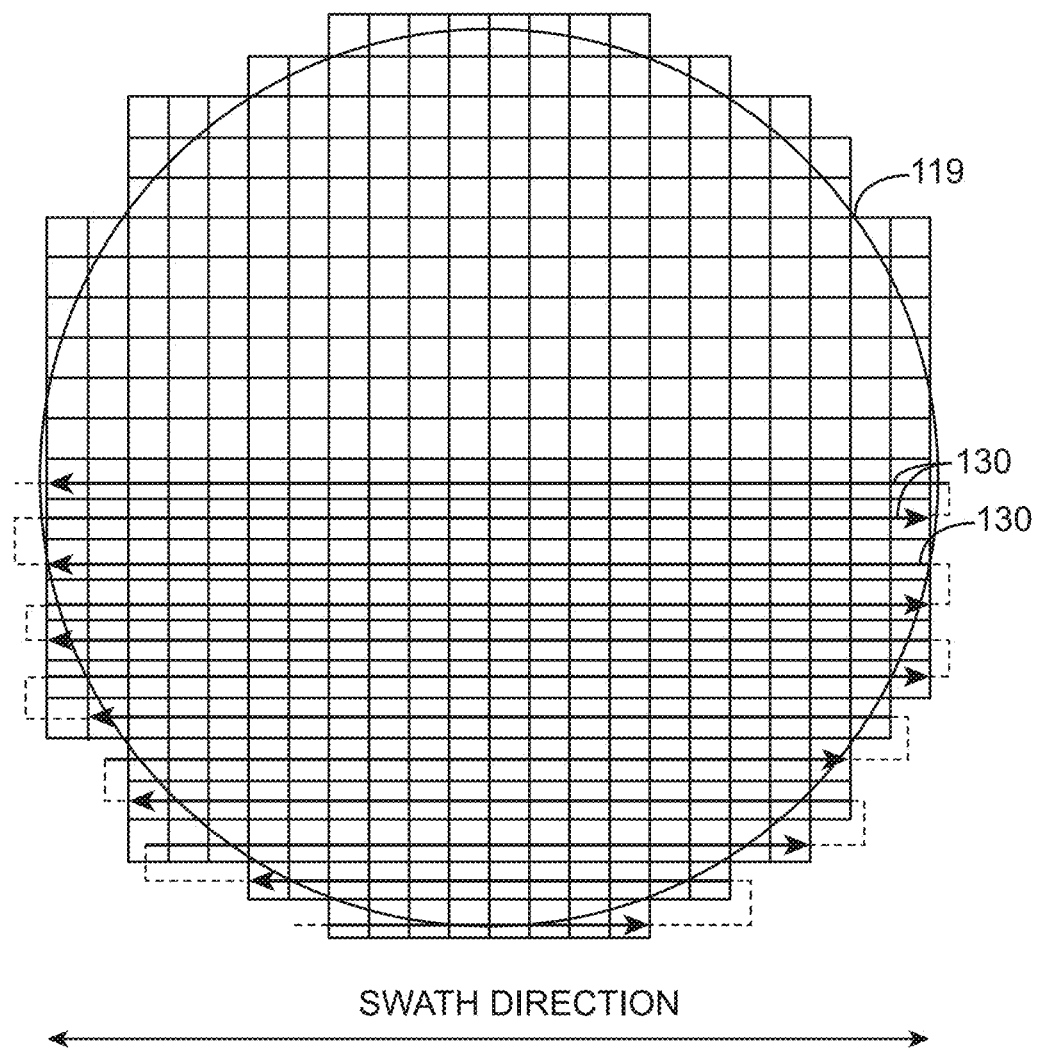
FIG. 5 is a schematic diagram illustrating a serpentine scan pattern used by a digital imager to scan a specimen slide, according to one embodiment.

As depicted in FIG. 5, during imaging, the slide 102 is moved by an XY slide stage to scan the field of view of a camera over the entire specimen area 114 (or a predetermined area of the entire actual specimen 119, e.g., if the actual specimen 119 covers a different area than the specimen area 114 and the boundary of the actual specimen 119 is previously determined). The XY slide stage moves the slide 102 in a back and forth serpentine path to capture micro images of a swath, row, or linear portion, of the specimen 119 on each pass. To capture a swath, the XY slide stage continuously moves the slide 102 and the camera is triggered by the XY slide stage to capture an image when each trigger point is reached according to the stage encoder position. A very high-speed camera is used so that the relative movement between the slide and the camera is continuous. At such high speeds, acquiring images along a linear portion of the slide may be referred to as "scanning" the row. A serpentine path, such that the start of each successive swath is close to the end of the previous swath, is used to minimize the time required to scan the entire specimen 119. As the slide 102 is moved along a swath, the camera captures micro images of the specimen 119. That is, the imager captures a plurality of images which cover the entire specimen area according to a scan pattern, such as the one depicted in FIG. 5. The scan pattern includes a plurality of linear portions represented by the horizontal arrows 130 in FIG. 5. The specimen is divided into a plurality of focus zones, represented by the squares 132 in FIG. 5. As such, each linear portion 130 along which images are acquired includes a plurality of focus zones 132. Each linear portion 130 may include 30-70 focus zones. In another example, rather than the slide 102 being moved, the camera is moved along the scan pattern while the slide 102 remains stationary. Regardless of whether the slide 102 is moved or the camera is moved, the slide 102 moves relative to the camera.

Most current WSI systems scan a single focal plane at a time. A typical scanner completes a 15×15 mm scan in 1 minute. At this rate, scanning a circular ThinPrep cell spot region to a depth of 14 focal planes would take at least 26 minutes. In order to dramatically increase the throughput of a slide digitizer, some systems are designed with a tilt angle between the objective lens and the glass slide. With this approach, the depth-of-field can be used to simultaneously digitize distinct layers, each at slightly different depths. Then the layers can be collapsed into a single composite, focused layer in an operation called focus merging, which involves choosing the layer (or portion of a layer) that exhibits the best focus, and stitching those well-focused regions together. With this approach the slide can be moved continuously under the objective lens without stopping to focus. The various layers are digitized and merged, and a system that essentially performs post-acquisition focusing can be constructed. The only limitation on such a system is the depth-of-field of the objective, which in turn translates into the maximum thickness of the specimen that can be imaged. The clear advantage of such a system is that no stopping and focusing is necessary.

Figure 6:
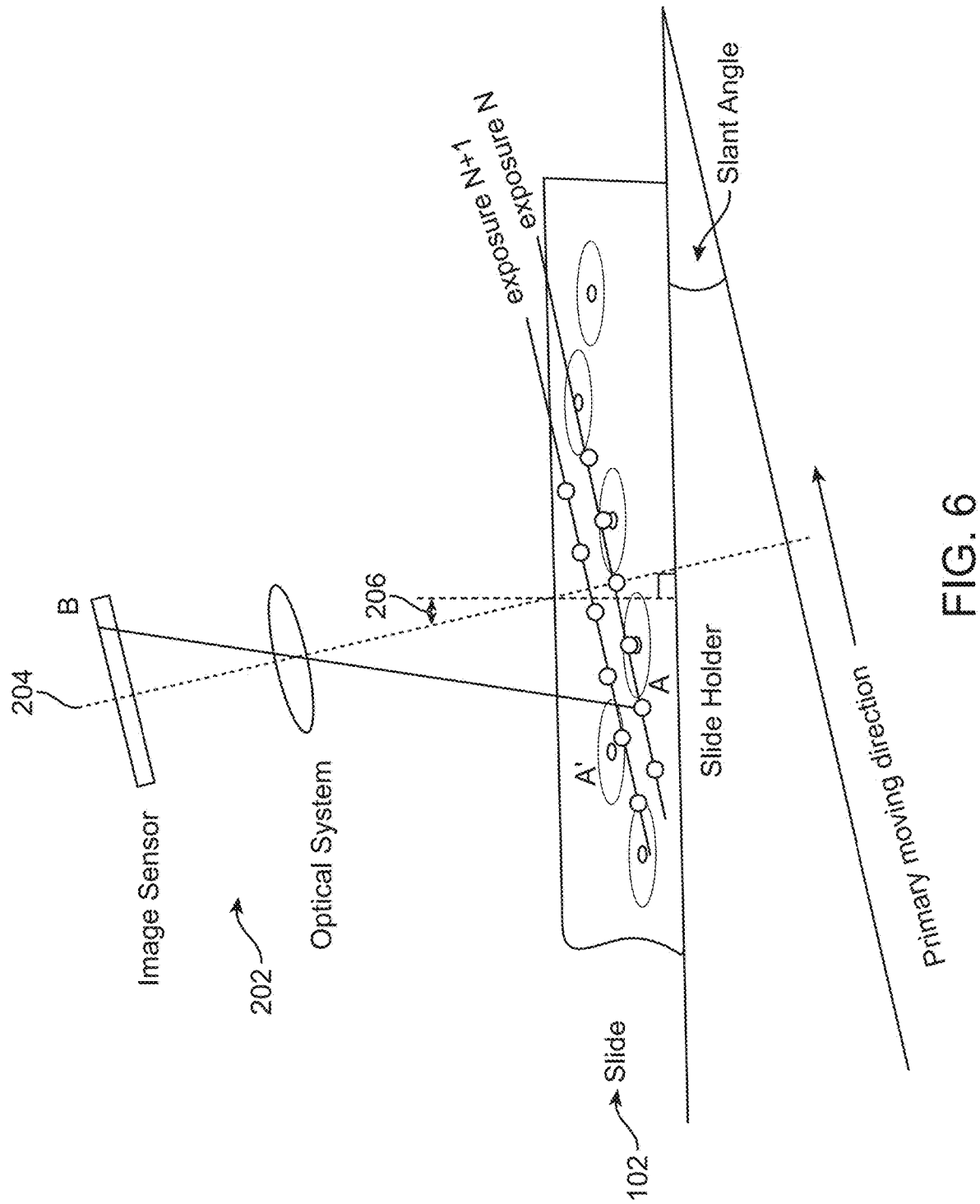
FIG. 6 is a schematic diagram illustrating a tilt angle of an imager relative to a slide.

Using a tilt-plane volumetric scanning method significantly decreases the acquisition time for scanning the full cell content area. A ThinPrep Pap slide can be completed in approximately 2.5 minutes. As shown in FIG. 6, the imaging optics and camera 202 are tilted with respect to the slide 102. The region of the image at one edge of the camera frame acquires images closer to the slide glass than the region at the other edge of the camera frame. In one example, a tilt angle of 48 milliradians and an image frame width at the slide of 0.5 mm provides a scan depth of 0.5×sin (0.048), which is 24 microns.

As best shown in FIG. 6, the optical axis 204 of the objective lens is tilted at a tilt angle 206 to the orthogonal of the plane of the slide 102 in the scanning direction (see FIG. 5). In other words, the resulting optical axis 204 of the camera and optics at the surface of the slide is non-orthogonal to the plane of the slide 102. As described in more detail in WO 2020/091965A2, the tilt angle 206 allows the imager to obtain volumetric images of the specimen 119 on the slide 102 (i.e., images that extend into the depth of a specimen 119). In other words, the micro images include an in-focus image of features at different depths of the specimen 119 on the slide 102, instead of only a single plane of focus in the case of an image taken at an orthogonal angle of the specimen 119. An imaging station may be configured to acquire micro images in which each of the micro images includes at least a portion of a depth of the slide 102 underlying the surface of the slide 102. If a coverslip 115 is used on slide 102, the imaging station may be configured to acquire micro images in which each of the micro images includes at least a portion of a depth of the coverslip 115.

Figure 7:
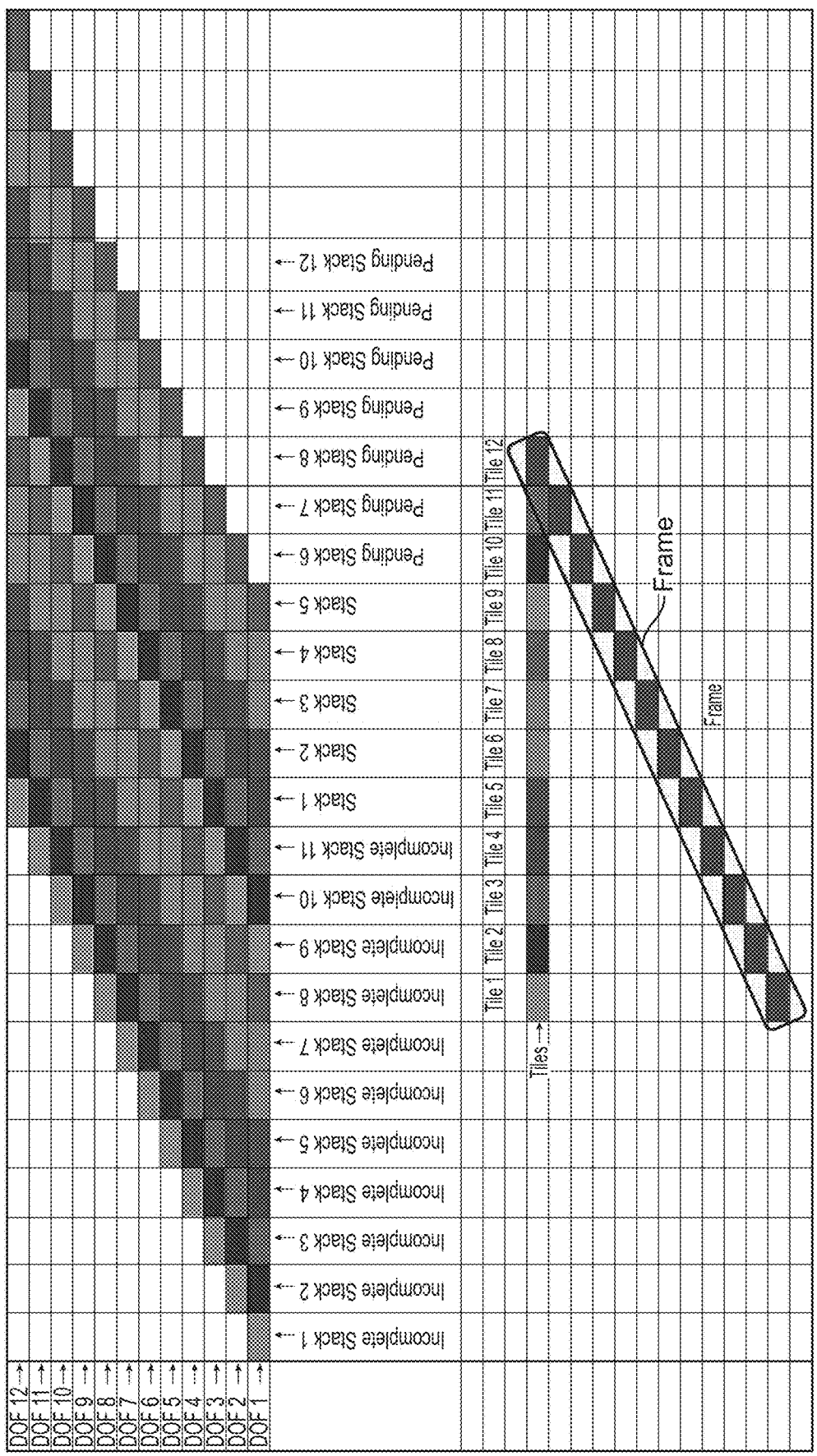
FIG. 7 is a graph depicting a focus merge operation.

As the camera moves continuously, it is triggered to obtain a new image every time it has moved $\frac{1}{14}$ of its own width. A very high speed (>100 fps) camera is used. These overlapping images can be sliced and reassembled to obtain the 14 focal plane images, as shown in FIG. 7, and as described in more detail in WO 2020/091965. To optimize storage space, the focal planes are combined into a single extended depth of field image by selecting in-focus pixels from the various planes. The image processing is done in real time using GPU hardware acceleration.

Figure 8A:
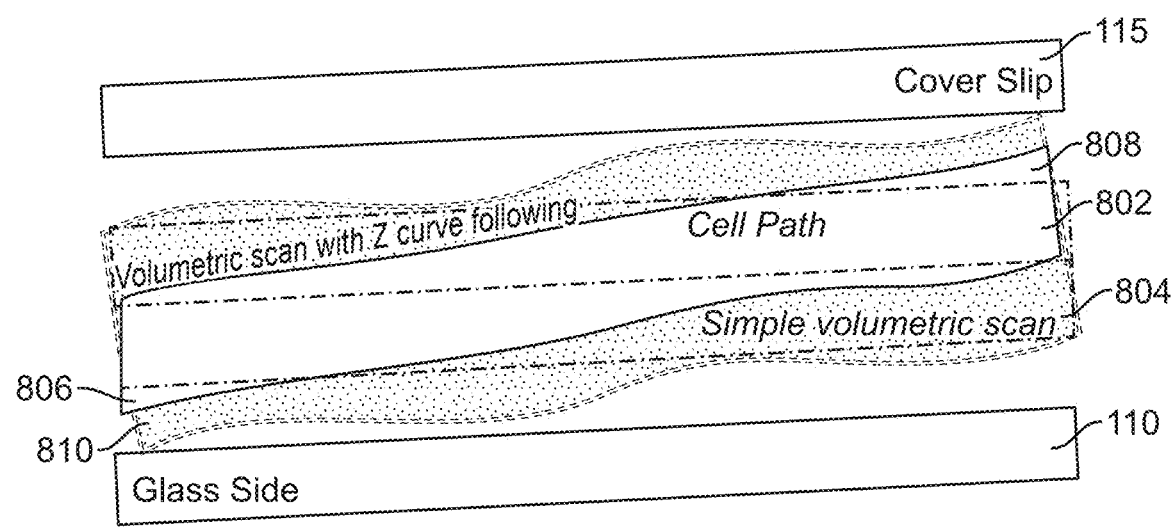
FIGS. 8A-8C are cross-sectional views of a specimen area depicting a cell path, an area covered by a volumetric scan, and an area covered by a volumetric scan with Z curve following.
Figure 8B:
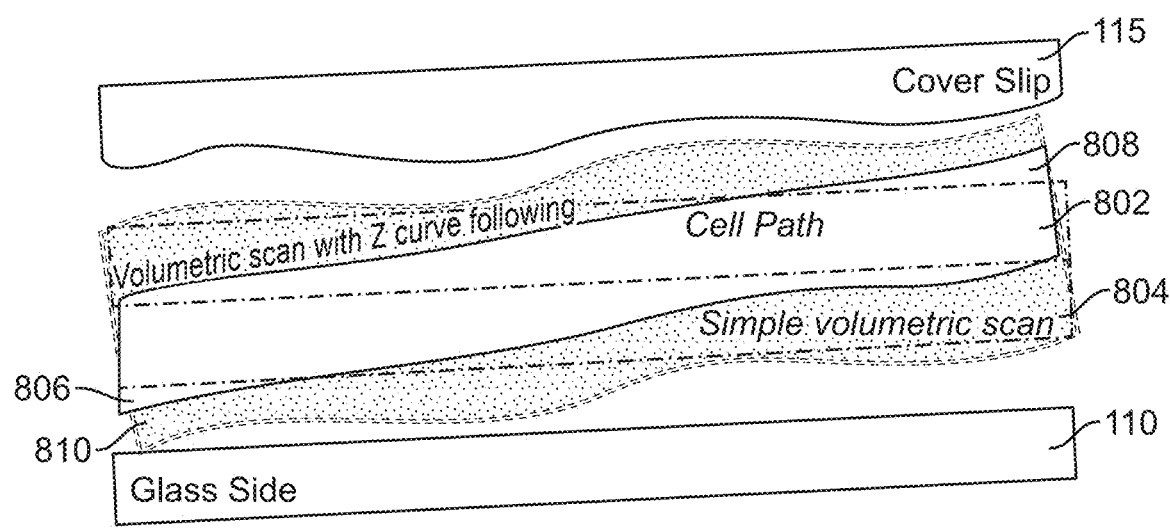
Figure 8C:
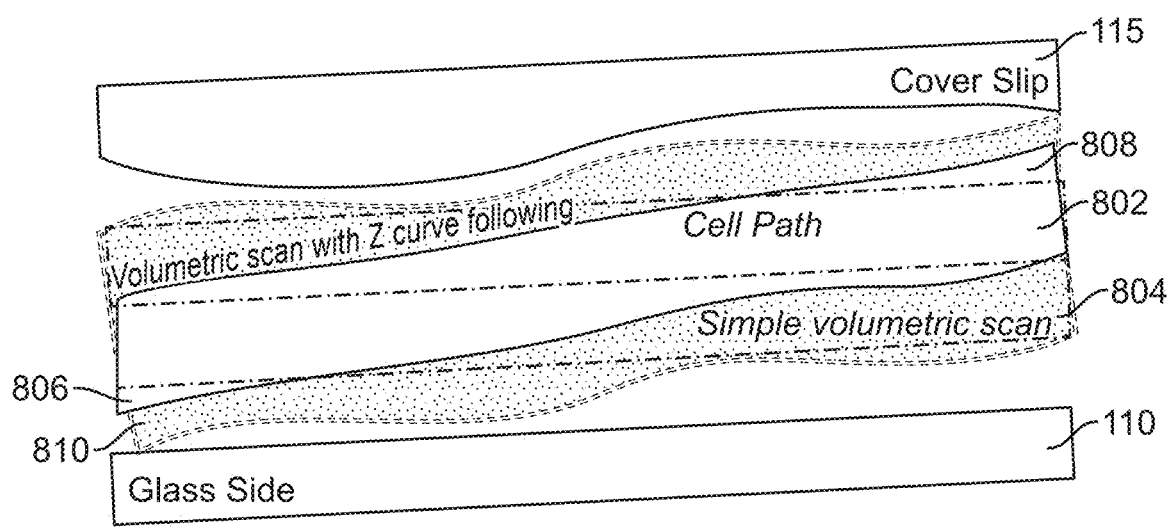

While coverslips are not perfectly flat, their variation in flatness is gradual in nature. This means the coverslip may form a hump in the center of the slide, or perhaps from multiple waves across the slide surface, but there are no abrupt changes in the distance between the coverslip and the underlying glass. For example, a perfectly flat coverslip 115 is shown in FIG. 8A, while coverslips having wavy or bumpy surfaces are shown in FIGS. 8B and 8C.

This slow-changing gap allows a post-acquisition focused imaging system a much larger effective depth-of-field than that provided by the optics alone. Basically, as the slide is scanned, typically using a raster back-and-forth pattern (as shown in FIG. 5), at the end of each pass (prior to reversing the direction of scan to interrogate the next row or swath), the collected layers are analyzed and the optimal focus is determined during the focus merge operation. As the biological material drifts up, following the undulating coverslip, the layer at which the best focus was found in the previous swath can be used to predict the best focus pattern for the next swath to be scanned. The individual objects of interest are found during focus merge and their depth is noted. Each row is then used to predict the best focus for the next row.

Upon detecting out-of-focus regions at the end of a swath, the swath may be re-scanned at a different height at which those out-of-focus regions are now in focus. The resultant focus heights could then the used to inform the next swath, which, in turn, minimizes the number of times swath re-scanned is required.

The advantage of such a system is that much higher throughput (lower scan times) can be achieved by virtue of the fact that it is not necessary to stop and focus; nor is it often necessary to go back and rescan out-of-focus regions. Instead the system simply scans back and forth until it has digitized (and focus merged) the entire specimen. While traversing, the objective lens is driven up and down according to the focus map it was given from the previous swath, all designed to keep the objects of interest within the depth-of-field such that they are all in focus despite their varying distance from the glass slide surface.

To handle the larger total cell depth range found on slides with film cover slips, the imaging optics can be driven in the Z axis to follow the curvature, as shown in FIGS. 8A-8C. The cell path 802 undulates and is generally tilted. The volumetric scan using the tilted camera as described above provides a thicker scanned region 804 than a scan that is done at a single depth of focus, but fails to provide in-focus images of a bottom portion 806 and top portion 808 of the cell path 802. The volumetric scan with Z curve following 810 captures the entire cell path 802 of the specimen. The local cell depth in the area the size of the camera field of view is within the tilt-plane scan depth, but over longer distances, the larger variation in focus depth may be necessary.

Figure 9A:
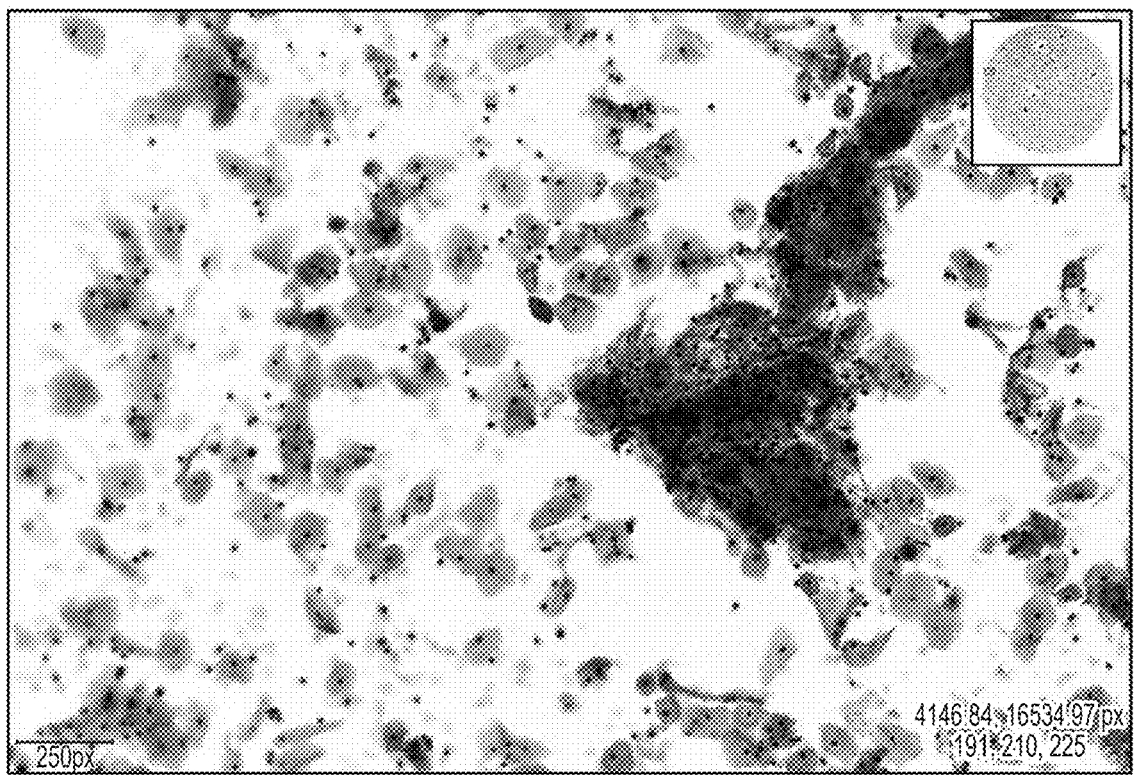
FIGS. 9A and 9B are images of a specimen acquired without Z curve following, and with Z curve following, respectively.
Figure 9B:
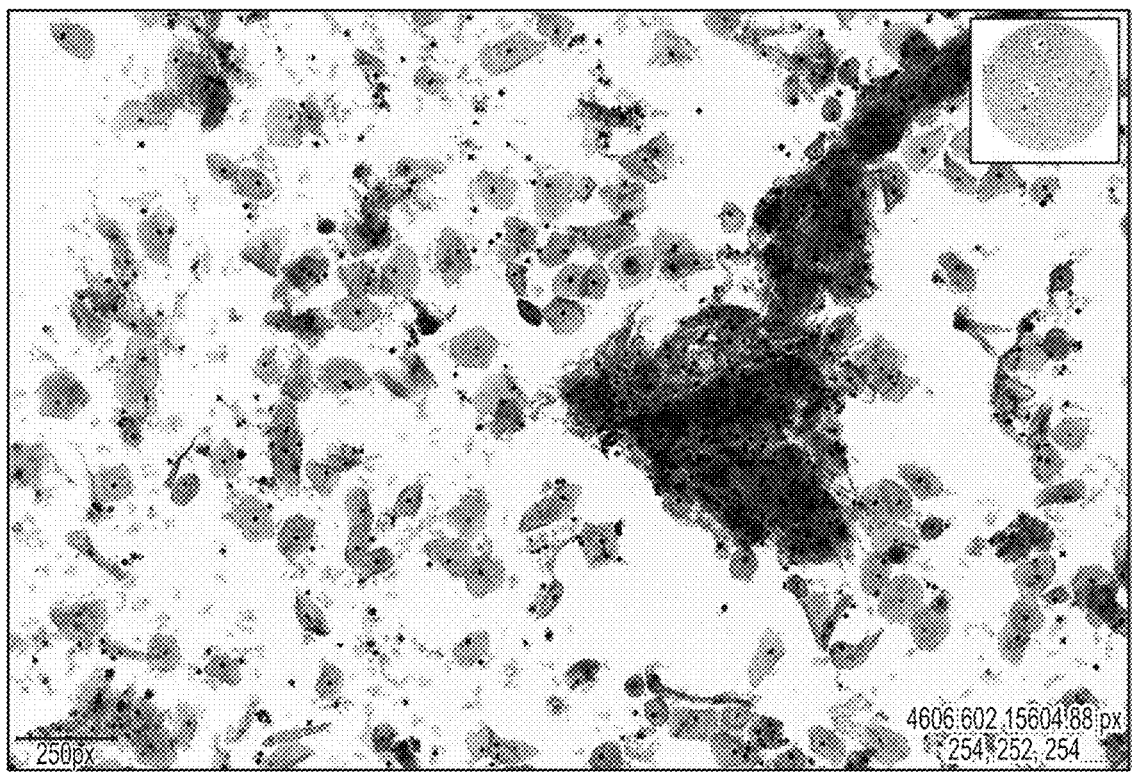

A curve-following scanning method minimizes local focus errors, providing higher quality WSI images. The slide used to create the images in FIGS. 9A and 9B has a Z focus depth over 40 microns. A volumetric scan without Z curve following is shown in FIG. 9A. A volumetric scan with Z curve following is shown in FIG. 9B. The image in FIG. 9B is clearer and more in-focus than the image in FIG. 9A.

Figure 10:
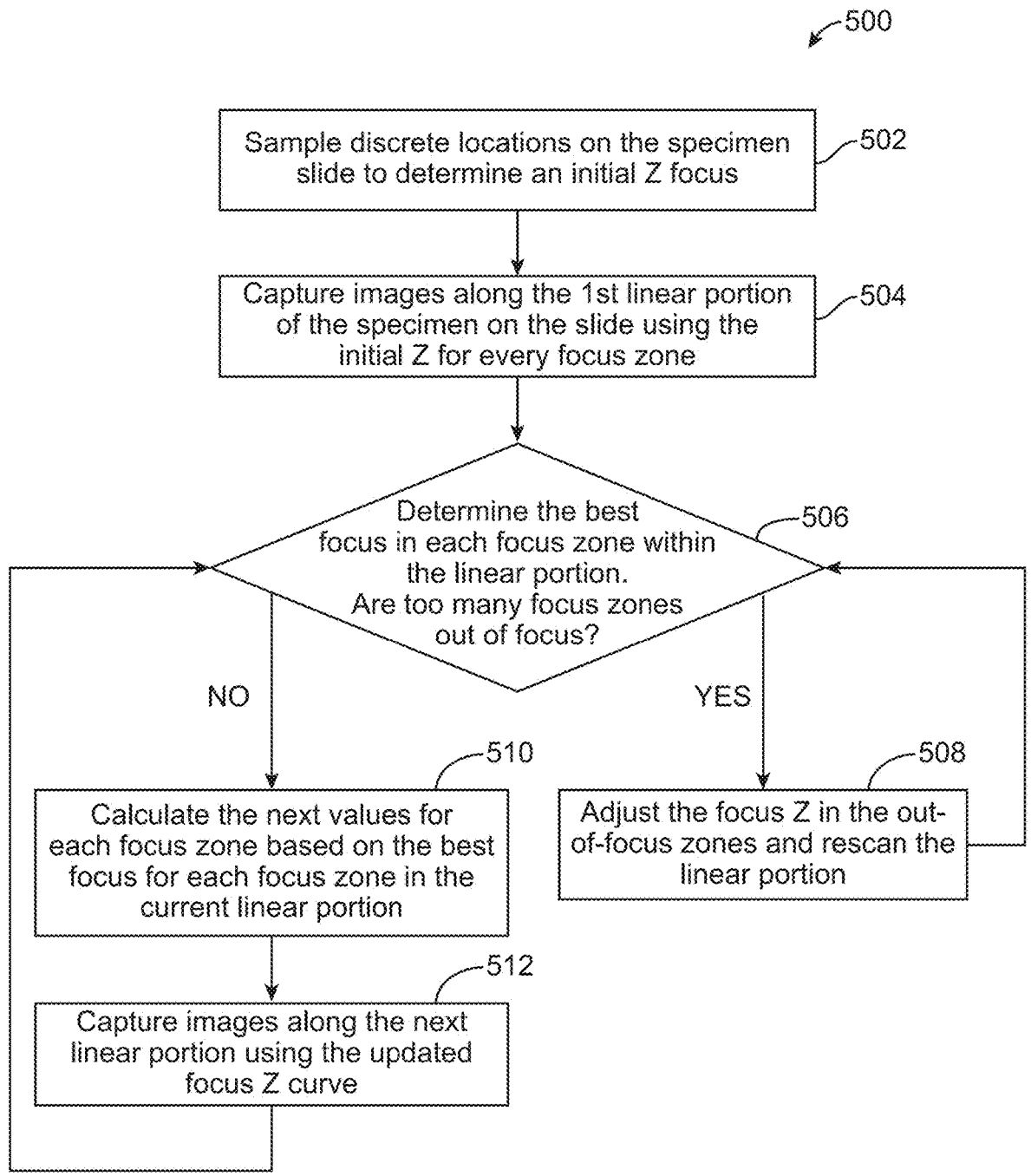
FIG. 10 is a flow chart of a method for acquiring images of a specimen using Z curve following.

Referring now to FIG. 10, a method 500 for acquiring images of objects distributed within a specimen affixed to a surface of a slide will be described. In particular, the images are acquired by using a volumetric scan with Z curve following for a specimen having an uneven height relative to the slide surface and having a thickness that exceeds the depth of field of the optics. In the first step 502 of the method 500, discrete locations on the specimen slide are sampled to determine an initial focus height (Z). Next, in step 504, several images are acquired along a first linear portion of the specimen using the initial focus height determined in step 502 for each focus zone in the first linear portion. The initial focus height remains constant along the first linear portion, which means that the height of the objective lens relative to the slide surface is substantially constant during acquisition of the images in the first linear portion of the specimen in step 504. Each row, or linear portion, of the specimen includes a plurality of focus zones.

For example, with reference to FIG. 5, each square along a linear portion may be a focus zone. Each linear portion to be scanned by the imager may include, for example, 30-70 focus zones. Alternatively, rather than using a substantially constant focus height as in step 504, the discrete locations sampled in step 502 can be used to determine a z curve for the first linear portion, and the images along the first linear portion may be acquired by following that z curve. As such, the objective lens moves up and down along the z-axis relative to the slide in accordance with the z curve during acquisition of the images along the first linear portion.

Next, in step 506, for each focus zone in the linear portion that was just scanned, the best focus is determined by evaluating whether the objects captured in the images are in focus. The evaluation includes determining whether out-of-focus objects are located in the specimen at a height relative to the slide surface that is outside of an in-focus range of the objective lens. The evaluation may also include identifying out-of-focus objects based on their relative locations along the linear portion of the specimen. That is, for each focus zone along the linear portion, the images are evaluated to determine which focal plane has the best focus. As depicted in FIG. 7, using the tilt angle image acquisition, images are captured in 12 focal planes at a time. For example, if the best focus is found to be in the upper-most or lower-most focal plane (focal plane 1 or 12), then the z-axis position of the objective lens relative to the slide may need to be moved up or down, respectively, in order to obtain an image with better focus. Additionally, if the best focus is found to be in the upper-most or lower-most focal plane, then the z-axis position of the objective lens relative to the slide may need to be moved up or down, respectively, during image acquisition in the next, adjacent linear portion of the specimen.

If too many of the objects are out of focus (i.e., the number of out-of-focus objects exceeds a pre-determined threshold number), the focus height (Z) for each of the out-of-focus objects is adjusted and the linear portion is re-scanned in accordance with the new focus height curve in step 508. When the camera follows a focus height curve, the z-axis position of the objective lens relative to the slide surface is varied by increasing and/or decreasing a height of the camera relative to the slide surface as a function of the relative location of the camera along the linear portion of the specimen. The z-axis position of the objective lens relative to the slide may change from one focus zone to the next along a linear portion of the specimen. In one embodiment, the slide 110 moves up and down while the z-axis position of the objective lens remains stationary. In an alternative embodiment, the objective lens moves up and down while the z-axis position of the slide remains constant.

If most, or all, of the focus zones are in focus, then in step 510, the next values for each focus zone are calculated based on the best focus for each focus zone in the current row. Some of the focus zones for the next row may move up (i.e., such that the z position is closer to the cover slip and farther from the glass slide) to track objects of interest that are closer to the cover slip, while some of the focus zones may move down for the next row to track objects of interest that are closer to the glass slide. Next, in step 512, the next linear portion is scanned using the focus curve calculated in step 510. Steps 506-512 are repeated for each linear portion in the specimen until images of the entire specimen are obtained. That is, after images are acquired for each linear portion of the specimen, the focus of the objects in those images is evaluated (step 506). Based on the evaluation, a focus curve for the next linear portion of the specimen is determined (step 510) and used for acquiring images of objects in the next linear portion (step 512), which is directly adjacent to the linear portion that was just scanned. Alternatively, if the focus evaluation reveals that too many of the objects are out of focus, the focus curve is adjusted, and the same linear portion is scanned again using the adjusted focus curve (step 508).

Although particular embodiments have been shown and described, it is to be understood that the above description is not intended to limit the scope of these embodiments, and that such disclosure is provided for purposes of explanation and illustration only. Thus, various changes and modifications may be made to the disclosed embodiments without departing from the scope of the following claims.

The invention claimed is:

1. A method for acquiring images of a plurality of cells distributed within a specimen affixed to a surface of a slide using a camera having an objective lens with an optical axis that forms a non-orthogonal angle with the surface of the slide, the cells distributed at various depths within the specimen, the method comprising:

(a) acquiring a first plurality of images of a first linear portion of the specimen;

(b) evaluating a focus of cells within the first linear portion of the specimen captured in the first plurality of images by generating a plurality of stacks of images comprising a plurality of levels for the depth of the specimen at each location along the first linear portion, dividing each stack of images into tiles, using a focus algorithm to determine a focus score metric at each level of each stack of images, determining an optimal focus height for each tile, and determining a best focus height for each cell within the specimen;

(c) calculating a z focus height curve of the best focus height of each of the cells within the specimen along the first linear portion; and (d) acquiring a second plurality of images of the first linear portion or of a second linear portion of the specimen different from the first linear portion, wherein a height of the objective lens relative to the slide surface is varied during acquisition of the second plurality of images based on the evaluated focus of each of the cells captured in the first plurality of images.

2. The method of claim 1, wherein a height of the objective lens relative to the slide surface is constant during acquisition of the first plurality of images.

3. The method of claim 2, wherein evaluating the focus of each of the cells captured in the first plurality of images comprises determining respective heights of out-of-focus cells relative to the slide surface.

4. The method of claim 3, wherein evaluating the focus of each of the cells in the first plurality of images comprises determining whether respective out-of-focus cells are located at a height relative to the slide surface that is outside of an in-focus range of the objective lens during acquisition in the first plurality of images.

5. The method of claim 3, wherein evaluating the focus of each of the cells in the first plurality of images comprises determining whether respective out-of-focus cells are located at a height relative to the slide surface that is higher than a maximum height or lower than a minimum height, respectively, of an in-focus range of the objective lens during acquisition in the first plurality of images.

6. The method of claim 1, wherein evaluating the focus of each of the cells captured in the first plurality of images comprises determining respective heights of out-of-focus cells relative to the slide surface.

7. The method of claim 6, wherein evaluating the focus of each of the cells in the first plurality of images comprises determining whether respective out-of-focus cells are located at a height relative to the slide surface that is outside of an in-focus range of the objective lens during acquisition in the first plurality of images.

8. The method of claim 6, wherein evaluating the focus of each of the cells in the first plurality of images comprises determining whether respective out-of-focus cells are located at a height relative to the slide surface that is higher than a maximum height or lower than a minimum height, respectively, of an in-focus range of the objective lens during acquisition in the first plurality of images.

9. The method of claim 1, wherein evaluating the focus of each of the cells in the first plurality of images includes determining respective locations of out-of-focus cells within the first linear portion.

10. The method of claim 2, wherein evaluating the focus of each of the cells in the first plurality of images includes determining respective locations of out-of-focus cells within the first linear portion.

11. The method of claim 1, wherein one or both of the camera and the slide is moved laterally relative to the other one during acquisition of the images.

12. The method of claim 11, wherein the height of the objective lens relative to the slide surface is varied by moving the slide to increase and/or decrease a height of the slide surface relative to the camera as a function of a linear position of the camera with respect to a lengthwise location of a respective linear portion.

13. The method of claim 11, wherein the height of the objective lens relative to the slide surface is varied by moving the camera to increase and/or decrease a height of the camera relative to the slide surface as a function of a linear position of the camera with respect to a lengthwise location of respective first or second linear portion.

14. The method of claim 2, wherein one or both of the camera and the slide is moved laterally relative to the other one during acquisition of the images.

15. The method of claim 14, wherein the height of the objective lens relative to the slide surface is varied by moving the slide to increase and/or decrease a height of the slide surface relative to the camera as a function of a linear position of the camera with respect to a lengthwise location of a respective linear portion.

16. The method of claim 14, wherein the height of the objective lens relative to the slide surface is varied by moving the camera to increase and/or decrease a height of the camera relative to the slide surface as a function of a linear position of the camera with respect to a lengthwise location of respective first or second linear portion.

17. The method of claim 1, wherein the second plurality of images is acquired of the second linear portion, the method further comprising evaluating a focus of each of the cells captured in the second plurality of images, including determining whether a total number of out-of-focus cells exceeds a threshold number and determining a best focus height of the specimen along the next linear portion;

calculating a second z focus height curve of the best focus height of the specimen along the second linear portion; and acquiring a third plurality of images of a third linear portion, the third linear portion being directly adjacent to the second linear portion, wherein a height of the objective lens relative to the slide surface is varied during acquisition of the third plurality of images based on the second z focus height curve.

18. The method of claim 1, further comprising repeating steps (a)-(d) until images of an entirety of the specimen have been acquired.

19. The method of claim 1, wherein evaluating a focus of objects within the first linear portion also includes determining whether a total number of out-of-focus objects exceeds a threshold number; and if the total number of out-of-focus objects in the first plurality of images exceeds the threshold number, then the step of acquiring a second plurality of images comprises re-imaging the first linear portion of the specimen to acquire a second plurality of images, wherein a height of the objective lens relative to the slide surface is varied during acquisition of the second plurality of images based on the z focus height curve; and if the total number of out-of-focus objects in the first plurality of images does not exceed the threshold number, then the step of acquiring a second plurality of images comprises imaging the second linear portion of the specimen directly adjacent to the first linear portion, wherein a height of the objective lens relative to the slide surface is varied during acquisition of the second plurality of images based on the z focus height curve.

20. The method of claim 1, wherein the specimen is a cytological specimen.

21. The method of claim 20, wherein the cells distributed within the specimen comprise cervical cells.

22. The method of claim 20, wherein the cells distributed within the specimen comprise bladder cells.

23. The method of claim 1, wherein a coverslip covers the specimen.

24. The method of claim 23, wherein the coverslip is a film coverslip.

\* \* \* \* \*